C. E. MAXFIELD.
NIPPLE AND CLAMP FOR PIPES.
APPLICATION FILED JULY 16, 1907.

961,247.

Patented June 14, 1910.

WITNESSES:
Brennan B. West.
G. A. Myers.

INVENTOR,
Charles E. Maxfield
BY Bates, Fouts & Hull
ATTYS.

UNITED STATES PATENT OFFICE.

CHARLES E. MAXFIELD, OF CLEVELAND, OHIO, ASSIGNOR OF TWO-FIFTHS TO EGBERT F. HAMMOND, OF CLEVELAND, OHIO.

NIPPLE AND CLAMP FOR PIPES.

961,247. Specification of Letters Patent. Patented June 14, 1910.

Application filed July 16, 1907. Serial No. 384,019.

*To all whom it may concern:*

Be it known that I, CHARLES E. MAXFIELD, a citizen of the United States, residing at Cleveland, in the county of Cuyahoga and State of Ohio, have invented a certain new and useful Improvement in Nipples and Clamps for Pipes, of which the following is a full, clear, and exact description, reference being had to the accompanying drawings.

This invention relates to nipples and clamps for hose and other pipes formed of compressible material, and has for its object the production of a device of this character which is simple and economical in construction, which is convenient in application and which forms a positive clamp between the nipple and a pipe that is to be clamped thereto, said pipe being clamped to the nipple by a member with an angularly shaped portion which compresses the pipe against the nipple and thereby prevents all possible leakage between the pipe and nipple.

Figure 1:
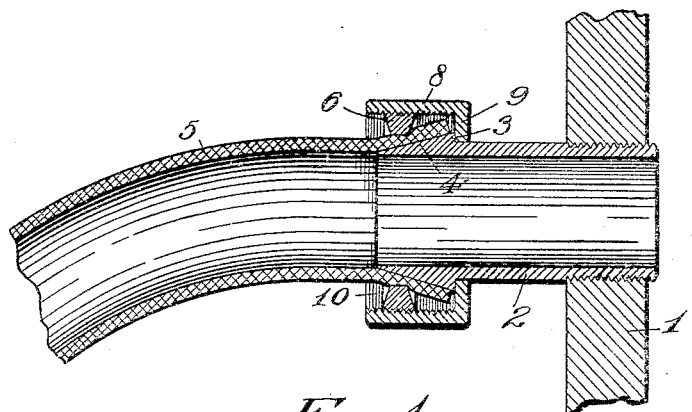
Figure 2:
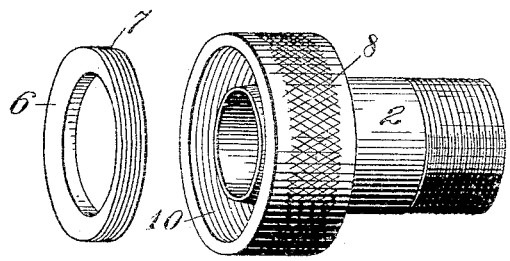

Referring to the drawings forming a part hereof, Figure 1 is a sectional, longitudinal view taken through the nipple and clamp and also through the pipe, and Fig. 2 is a perspective view of the nipple and clamp, the compressing ring or member being removed from its thimble.

Taking up a more detailed description of the invention by reference to the drawings, in which the same reference character designates the same part throughout the several views, 1 represents a portion of a tank or boiler to which the nipple 2 is adapted to be secured in any suitable way, as by screwing into a threaded hole in said tank or boiler, as shown. This nipple is preferably of uniform diameter throughout the major portion of its length, but near its outer end it is expanded at substantially right angles so as to form a shoulder 3, beyond which the nipple gradually tapers to a comparatively thin edge, the tapered portion being shown at 4. The pipe or tube which is shown at 5 may be an ordinary hose pipe or may be formed of any compressible material such, for example, as lead. This pipe is forced over the tapered portion 4 of the nipple, and is clamped thereto by a ring member 6, said member having its sides preferably inclined toward the center of the ring so that the interior of the ring is narrower than the exterior. The outer perimeter of this ring is screw threaded, as shown at 7, to adapt it to be screwed into an exterior sleeve or thimble 8. This thimble has an inwardly turned flange 9 with an opening therethrough fitting the nipple 2 beyond the shoulder 3, against which shoulder said flange engages. The thimble is screw threaded on its interior at 10, the threads fitting the threads 7 on the ring member 6.

In applying my invention, the nipple 2 is first passed through the opening in the thimble and the nipple is then screwed to the tank or cylinder 1. The ring member is then slipped over the tube or pipe 5 and the latter is then forced over the tapered end 4 of the nipple. The ring member 7 and the thimble are then brought into threaded engagement, whereupon, by turning the latter in the proper direction, the ring is screwed into the thimble, which compresses the end of the pipe against the tapered face of the nipple. Owing to said tapered face, the farther the ring is screwed into the thimble, the greater will become the compression of the pipe, and in this manner a tight joint can be formed which will prevent all leakage.

Owing to the angular form of the compressing surface of the ring 6, the tube or pipe 5 is abruptly compressed, and a tighter and more efficient joint can be formed than would be the case were the engaging surface of said ring formed on an incline substantially parallel with the tapered face of the nipple. Furthermore, this angular engaging surface is much more efficient in its adherence to the pipe and, for this reason, the ring will not turn upon the pipe during compression and no wrench for turning or holding such ring is necessary. Also, owing to said angular shape of the compression ring and the consequent abrupt compression of the pipe, no wrench is usually necessary for turning the thimble sufficiently for securing a tight joint. If a wrench is found necessary at any time, an ordinary pipe wrench may be used, or the thimble may be provided with a polygonally shaped exterior to adapt it to the use of the ordinary monkey wrench.

I claim,

In a device of the character described, a nipple having an exterior shoulder and a tapered portion in front of such shoulder, said tapered portion being adapted to receive a tube or pipe, an internally threaded thimble surrounding the nipple and having a projecting flange adapted to engage with the shoulder upon the nipple and space the body portion of the thimble from the nipple, a ring having tapered sides, the exterior surface of said ring being wider than the interior surface thereof, the exterior surface being provided with screw threads adapted to engage with the threads on the interior of the thimble, the interior surface of said ring being substantially straight, whereby an angular portion is presented to the pipe or tube which engages the tapered portion on the nipple, said ring being adapted to be drawn in against the pipe as the thimble is turned to press against the pipe and form a tight joint substantially as described.

In testimony whereof, I hereunto affix my signature in the presence of two witnesses.

CHARLES E. MAXFIELD.

Witnesses:
S. E. FOUTS,
BRENNAN B. WEST.